UNITED STATES PATENT OFFICE.

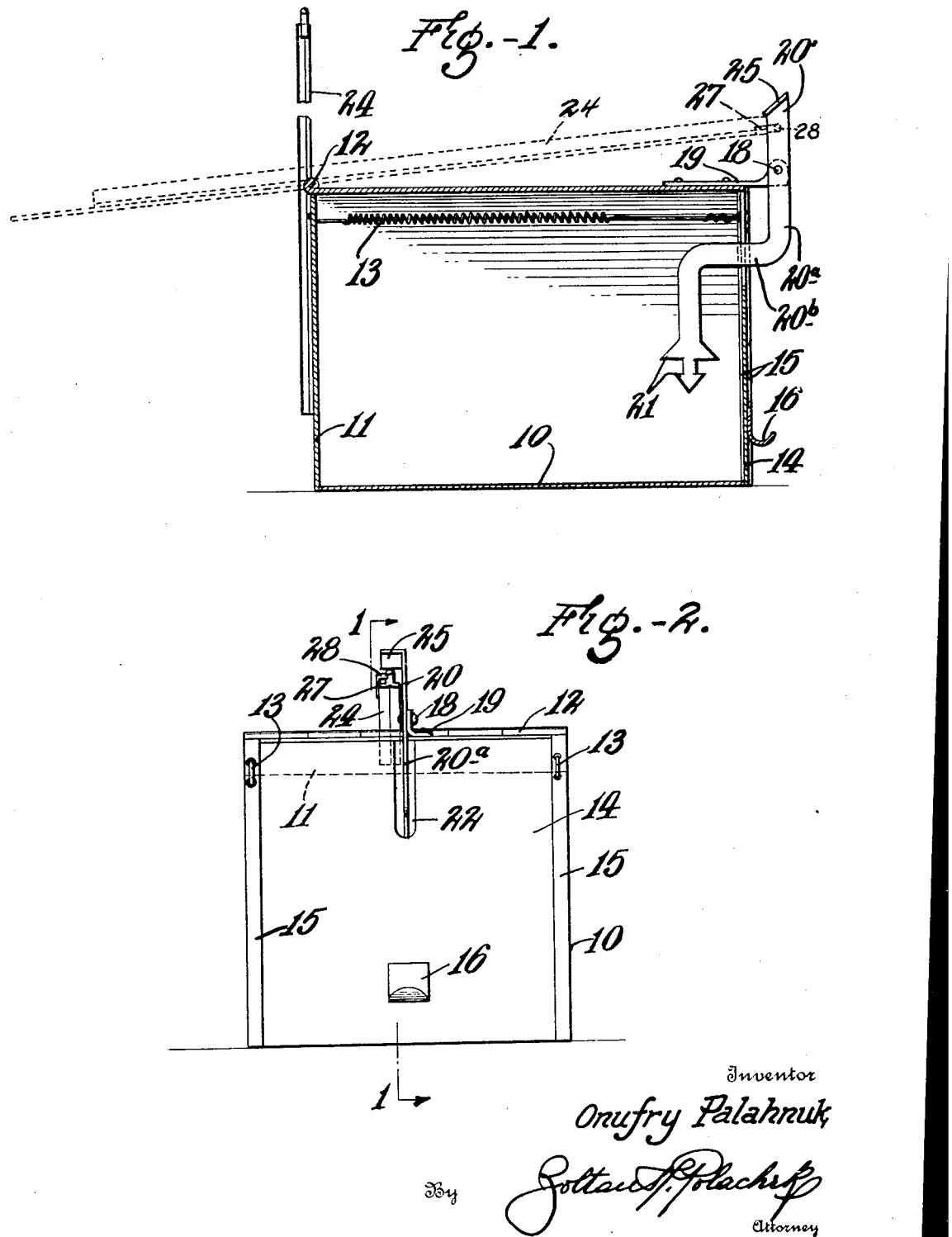

ONUFRY PALAHNUK, OF FORD, ONTARIO, CANADA.

ANIMAL-TRAP.

1,387,803.

Specification of Letters Patent.  Patented Aug. 16, 1921.

Application filed January 11, 1921. Serial No. 436,411.

*To all whom it may concern:*

Be it known that I, ONUFRY PALAHNUK, citizen of Russia, residing at Ford, in the Province of Ontario, Canada, have invented certain new and useful Improvements in Animal-Traps, of which the following is a specification.

This invention relates to animal traps, being intended more particularly for embodiment in a mouse or rat trap, although not necessarily limited thereto.

The invention has for an object to provide a simple and inexpensive form of trap, and more specifically to provide a trap in which movement of the bait carrying member will act to draw the animal farther into the trap when the door is closing.

For further comprehension of the invention, and of the objects and advantages thereof, reference will be had to the following description and accompanying drawings, and to the appended claims in which the various novel features of the invention are more particularly set forth.

Figure 1 of the drawings is a longitudinal sectional view of an animal trap constructed according to the invention, this view being taken on the line 1—1 of Fig. 2.

Fig. 2 is a rear end elevation.

As here shown my improved trap comprises an oblong rectangular box 10, the front end of which is constituted by a trap door 11 hinged to the top of the box as at 12 to swing outwardly and upwardly, this door being urged toward closed position by a pair of tension springs 13 connected at one end thereto and at opposite ends to the rear end of the box. The rear end of the box is formed by a door 14 slidable in vertical guides 15 on the sides of the box 10 and adapted to open downwardly to permit of easy access to the bait carrying member of the trap, the door 14 being provided with a handle 16.

The bait carrying member comprises a lever 20 pivoted between its ends as at 18 to a bracket 19 secured upon the top of the box and overhanging the rear edge thereof. This lever occupies a generally vertical position when the trap is set, its upper arm 20′ being adapted to hold the door 11 in open position while its lower arm 20ª is adapted to carry the bait, being provided with the double hooked elements 21 to which the bait is attached. To bring this end of the lever 20 within the box 10 the arm 20ª has an intermediate horizontal offset 20ᵇ which passes through a slot 22 in the door 14.

Secured upon the trap door 11, and extending rearwardly over the box 10 when the door is open, is a fixed arm 24 the outer, or rear, end of which engages under a detent lug 25 on the arm 20′ of the lever 20, so that when the lower arm 20ª is pulled forward by the animal seizing the bait the upper arm 20′ moves backward and releases the arm 24 on the door 11.

Extending rearwardly from the arm 24 to one side of the lug 25, is a finger 27 which has a lateral hook 28 at its rear end which projects under the inclined rear face of the lug 25 and, as the arm 24 swings upwardly upon being released, as above pointed out, engages this inclined rear surface of the lug, which constitutes a cam element, and swings the upper arm 20′ of the bait lever forwardly and the lower arm 20ª rearwardly, moving the bait toward the rear of the trap. As the animal will tend to follow the bait, the trap does not need to be made of excessive length in order to insure of the door closing upon the animal and the trap can therefore be used in locations where the space is limited, while the nearness of the bait to the door increases the chances of the animal entering.

Access to the bait hooks can be readily had by turning the trap on its side and opening the sliding door 14, the slot 22 allowing the latter to clear the bait lever arm 20ª.

Having thus described my invention what I claim as new and desire to protect by Letters Patent of the United States is as follows:

1. An animal trap comprising a box, a bait lever having one end in said box, a trap door, coöperating devices on said bait lever and trap door whereby the former holds the latter open, and coöperating devices on said bait lever and trap door whereby closing movement of the door moves the lever in a direction opposite to its door releasing movement.

2. An animal trap comprising a box, a bait lever having one end in said box, a trap door, coöperating devices on said bait lever and trap door whereby the former holds the latter open, and coöperating devices on said bait lever and trap door whereby closing movement of the door moves the lever in a direction opposite to its door releasing movement, said last devices including a cam member carried by the lever, and a hooked finger on the door adapted to engage the cam member.

3. An animal trap comprising a box having a vertical slot in one end, a bait lever fulcrumed between its ends outside said slotted end of the box, said lever occupying a generally vertical position with one arm thereof presenting a horizontally projected intermediate portion extending through said slot, said arm being adapted to carry bait, a hinged door on the opposite end of said box, a spring normally urging said door to closed position, a fixed arm on said door extending rearwardly over the box when the door is open, and means on the other arm of said lever adapted to engage said door arm to retain the door open.

4. An animal trap comprising a box, a bait lever fulcrumed between its ends on said box near one end thereof and having one arm extending into said box and adapted to carry bait, a hinged door on the opposite end of said box, a spring normally urging said door to closed position, a fixed arm on said door extending rearwardly over the box when the door is open, a detent lug on the other arm of said bait lever adapted to engage said door arm to hold the door open, said detent lug presenting a cam face, and a hooked finger on said door arm adapted to engage said cam face when the door is released, for the purpose set forth.

5. An animal trap comprising a box, a hinged trap door constituting one end of the box, a sliding door comprising the opposite end of the box and being vertically slotted, and a bait lever fulcrumed exteriorly to said box and having an arm projecting through the vertical slot in the sliding door.

In testimony whereof I have affixed my signature.

ONUFRY PALAHNUK.